No. 874,611. PATENTED DEC. 24, 1907.
W. E. G. MORTIMORE.
BOLT FOR FIXING RAILWAY CHAIRS, RAILS, AND THE LIKE.
APPLICATION FILED FEB. 4, 1907.

Witnesses.
Percy M. Goodwin.
Edwin Chas. Axe

Inventor.
Walter Edward George Mortimore.
by His Attorney
Benj. V. King.

UNITED STATES PATENT OFFICE.

WALTER EDWARD GEORGE MORTIMORE, OF GOSPORT, ENGLAND.

BOLT FOR FIXING RAILWAY CHAIRS, RAILS, AND THE LIKE.

No. 874,611.     Specification of Letters Patent.     Patented Dec. 24, 1907.

Application filed February 4, 1904. Serial No. 355,663.

*To all whom it may concern:*

Be it known that I, WALTER EDWARD GEORGE MORTIMORE, a subject of the King of Great Britain and Ireland, and resident of 77 North street, Gosport, in the county of Hampshire, England, have invented a certain new and useful Improvement in Bolts for Fixing Railway Chairs, Rails, and the Like, (for which I have obtained a patent in Great Britain, No. 4,444, bearing date February 23, 1906,) of which the following is a specification.

The bolt for fixing railway chairs, rails and the like according to the present invention consists essentially of two parts, one the bolt proper and the other a metal cone screwed on to the lower part of the bolt adapted when the bolt is driven home to retain the same in position.

In order that the said invention may be readily understood reference is to be had to the following description and accompanying sheet of drawings in which:—

Figure 1:
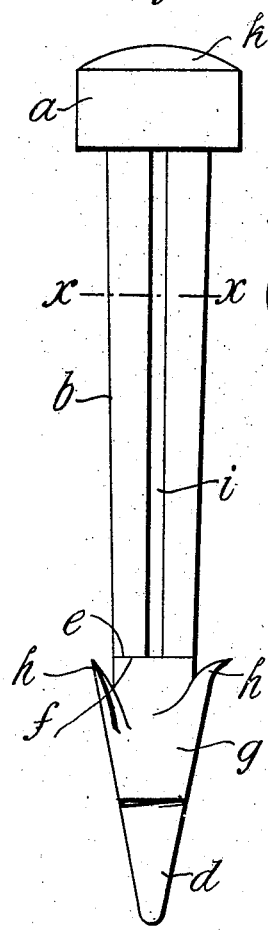
Figure 2:
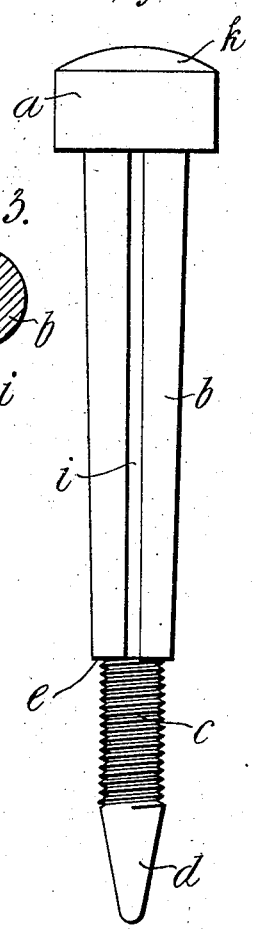
Figure 4:
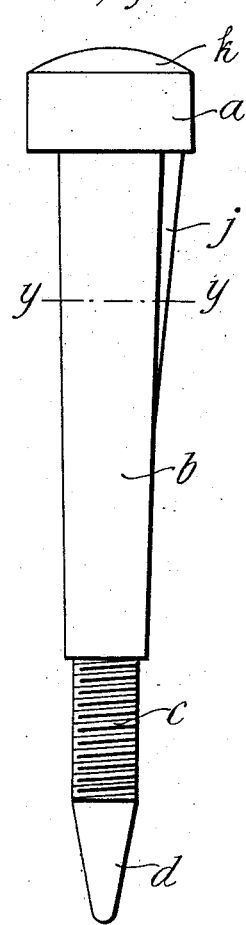
Figure 3:
Figure 5:

Figure 1 is a view of the bolt complete; Fig. 2 a view of the bolt with cone detached; Fig. 3 a section on line $x, x$ Fig. 1; Fig. 4 a view of a modified form of bolt; Fig. 5 a detached view of the cone; and, Fig. 6 a section on line $y, y$ Fig. 4.

Like letters of reference indicate corresponding parts.

In said drawings $a$—Figs. 1, 2 and 4, represents the bolt head and, $b$ the taper shank having at its lower end a reduced screw-threaded portion $c$—Figs. 2 and 4—terminating in a point $d$. The shoulder $e$ of the shank, formed by the reduced portion $c$, is adapted to be engaged with by the top part $f$ of the metal cone $g$ which screws on to said reduced part $c$ so as to form the entire bolt as in Fig. 1. The cone is cut away in parts leaving upwardly and outwardly extending projections, tongues or barbs $h$—Figs. 1 and 5—which, when the bolt is driven into the material in the usual manner, keep said cone firmly screwed up to the shoulder on bolt or shank by the engagement of said projections, tongues or barbs with the material into which the cone is driven.

Figure 6:
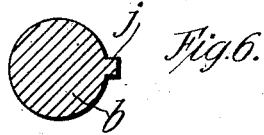

The bolt during the driving process is obstructed by the groove on shank as in Figs. 1 to 3 or by the rib as in Figs. 4 and 6, and further the top part $k$ of the head $a$ of the bolt is made dome-shaped so as not to be knocked out of shape when being driven. The bolt may be withdrawn by the use of a spanner or wrench to overcome the resistance offered by the spline against backward movement of the spike, this, of course, increasing the size of the hole in the wood, permitting the withdrawal of the spike, but the cone remains fast in the material by reason of the engagement of the tongues or projections with said material.

Having now described my invention, what I claim as new and desire to secure by Letters Patent of the United States is:—

1. A bolt for fixing railway chairs, rails and the like, consisting of a head and shank, the shank having a screw-threaded reduced portion terminating in a driving point, a shoulder formed by such reduction and means on said shank to prevent the rotation thereof.

2. A bolt for fixing railway chairs, rails and the like, consisting of a head and taper shank, the shank having a screw-threaded reduced portion terminating in a driving point, a shoulder formed by such reduction, a cone adapted to be screwed on to said reduced portion of shank to engage the shoulder thereof and means on said shank to prevent the rotation thereof.

3. A bolt for fixing railway chairs, rails and the like, consisting of a head and taper shank, the shank having a screw-threaded reduced portion terminating in a driving point, a shoulder formed by such reduction, a screw-threaded cone having upwardly and outwardly extending tongues, projections or barbs to engage the reduced portion of the shank for the purpose of keeping the cone up to the shoulder and means on said shank to prevent the rotation thereof.

In testimony whereof I have affixed my signature in presence of two witnesses.

WALTER EDWARD GEORGE MORTIMORE.

Witnesses:
A. J. WHITTIER,
A. J. NORMAN.